April 30, 1940.  C. BREER ET AL  2,198,653
MOTOR VEHICLE BODY
Original Filed March 11, 1935   2 Sheets-Sheet 1
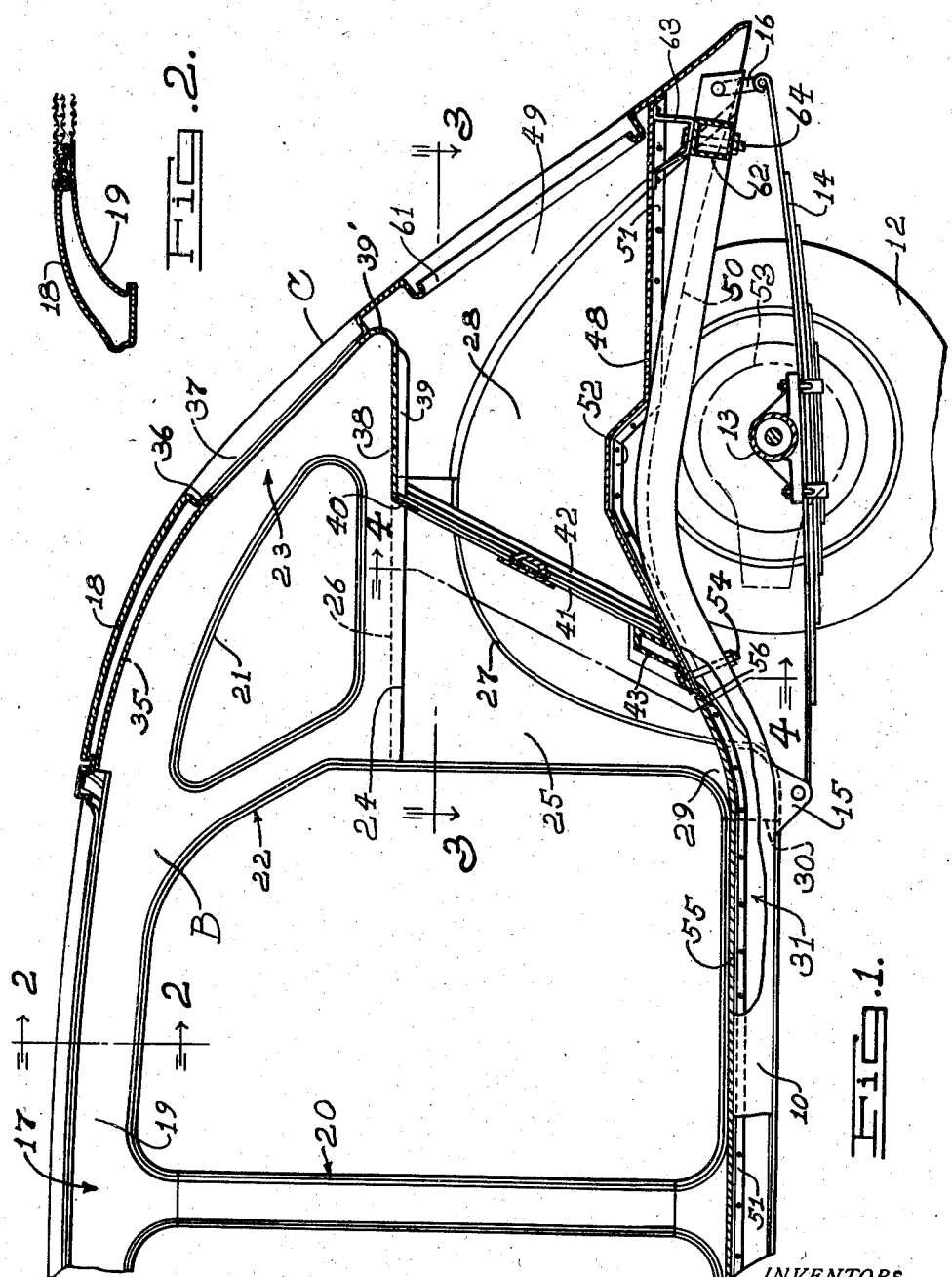
INVENTORS
CARL BREER
ALEXANDER G. HERRESHOFF
BY OLIVER H. CLARK AND
ROBERT CADWALLADER.
Harness, Dind, Patee & Harris
ATTORNEYS.

Patented Apr. 30, 1940

2,198,653

UNITED STATES PATENT OFFICE 2,198,653

MOTOR VEHICLE BODY

Carl Breer, Grosse Pointe Park, Alexander G. Herreshoff, Grosse Pointe Village, and Oliver H. Clark and Robert Cadwallader, Detroit, Mich., assignors to Chrysler Corporation, Highland Park, Mich., a corporation of Delaware Original application March 11, 1935, Serial No. 10,402. Divided and this application February 16, 1938, Serial No. 190,686

13 Claims. (Cl. 296—28)

This invention relates to motor vehicles and refers more particularly to improvements in body structures of motor vehicles, and is a division of our application Serial No. 10,402, filed March 11, 1935.

It is an object of our invention to provide a motor vehicle body structure having improved characteristics of strength and rigidity.

Another object of the invention is to provide a body structure fabricated in an improved manner largely from preformed, built-up, or assembled main body panels or sub-assembly units, connected together to provide a substantially unitary rigid structure having improved strength and rigidity.

A still further object of the invention relates to the provision of novel, relatively strong, durable and efficient joint structures or connections between the various component parts of the body structure; to the provision of improved means for utilizing the plates, panels or shells of the body structure for carrying a portion of the stresses, and to improved means for efficiently distributing the latter throughout the body; and to the provision of improved means for bracing the body parts.

More particularly the invention has for its object the provision of improved means for structurally connecting and bracing the body forming side structures or panels, including bracing means adapted to torsionally strengthen the body side structures and to prevent their weaving; to provide connecting means of this type preferably including an X-shaped structure characterized by strength and rigidity; and to structurally connect the bracing and body forming side structures in a manner to provide a body structure having relatively great strength and rigidity for the weight thereof.

Further objects and advantages of our invention will be more apparent from the following illustrative embodiment thereof, reference being had to the accompanying drawings, in which:

Fig. 1 is a sectional elevational view of the rear portion of the vehicle body embodying the invention, the section being taken approximately along the vertical longitudinal mid-plane of the body.

Fig. 2 is a detail section view taken along the line 2—2 of Fig. 1.

Figure 3:
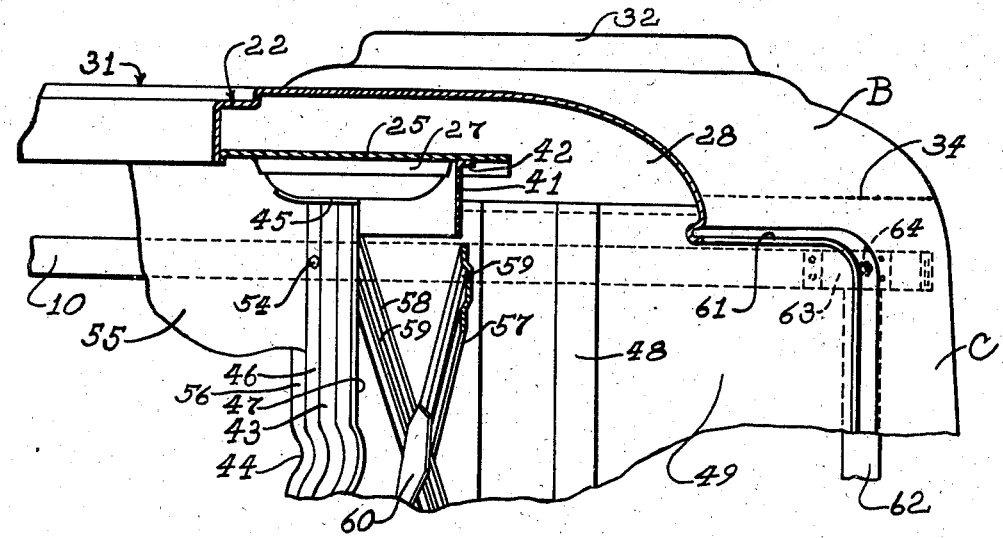
Fig. 3 is a sectional plan view, the section being taken along the line 3—3 of Fig. 1.

Referring to the drawings, the invention is illustrated and described in connection with the rear portion of a closed body structure although it will be understood that the invention in its broader aspects is not to be so limited and may, if desired, be applied to other portions of the body and to other types of the latter without departing from the spirit of the invention.

The body structure is, in general, of the all steel unitary construction fabricated largely from a plurality of preformed, built-up, or assembled main body panels forming self-assembly units, although if desired, the entire body structure may be fabricated or built-up without first providing the aforesaid preformed assembly. The latter are preferable inasmuch as they facilitate manufacture, assembly and servicing of the body structure. The component parts are, for the most part, welded into one unitary rigid structure of improved strength and rigidity. While we prefer to largely weld the component parts due to the advantages resulting therefrom, nevertheless rivets or bolts may be employed to facilitate final assembly and the invention in its broader aspects is not to be limited to the particular type of connecting means.

As set forth in the aforesaid original application, the body structure is preferably formed of four main structural portions adapted to be welded together to form a rigid unitary body structure, such main portions including a front portion (not shown), oppositely disposed side forming body structures or panels, one of which is shown at B, and the body rear panel C. The invention is illustrated and described in connection with the side structures or panels B and the rear panels C, reference to the remaining portion of the body structure being omitted. Furthermore, for the purpose of clarity and brevity the description will be limited to the typical structure along the right hand half of the body, it being understood that the body and chassis are arranged symmetrically about the longitudinal vertical central plane through the vehicle.

The body is preferably mounted on a vehicle chassis structure including the main side rails or sills 10, 11 (Fig. 4) and suitable cross members, although the body, in the broader aspects of the invention, may be directly supported as a rigid unit by the vehicle road wheels with appropriate springs intermediate the latter and the body. The rails 10, 11 are preferably tensioned members adapted to transmit a portion of the load to the body structure, the latter receiving and distributing stresses throughout the area thereof in the manner set forth in our original application. The rear driving ground wheels 12, one of which is shown in Fig. 1, are supported by an axle 13 carrying springs 14, one of which is shown in Fig. 1. The latter is shackled forwardly at 15 to the chassis rail 10 at the juncture of the door column whereby a portion of the chassis load is distributed to the body structure as set forth in our original application. The spring is shackled rearwardly at 16 adjacent the rear end at one of the chassis rails for transmitting load to the body structure.

The panel or side structure B includes a top rail or sill 17 of hollow construction and has an outer channel 18 welded to an inner channel 19, the outer channel 18 being the outer skin of the panel B which extends forwardly of the body. These channel members cooperate with the various members described in our parent application to provide a unitary column 20.

Figure 4:
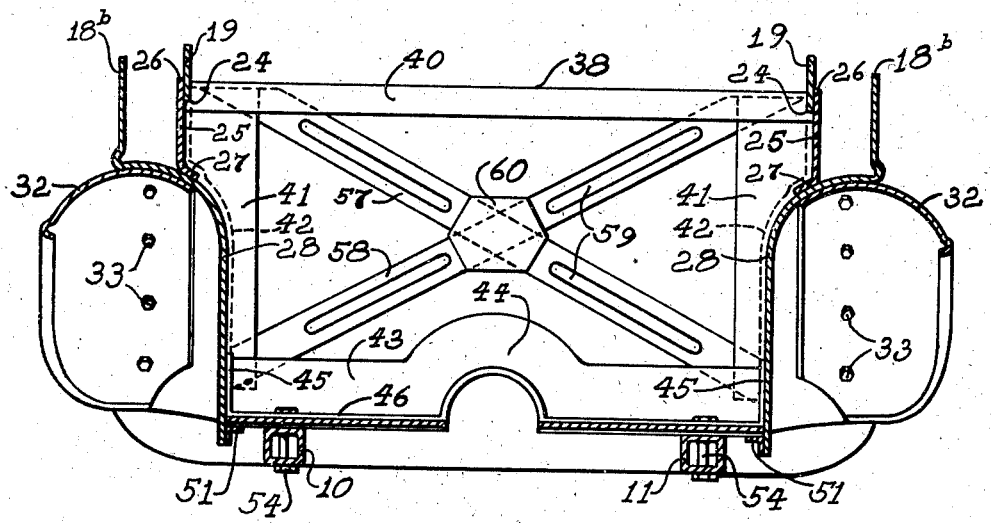
Fig. 4 is a sectional elevational view transversely of the body, the view being taken along the line 4—4 of Fig. 1.

The typical top body rail 17 continues rearwardly beyond the intermediate column 20 and then divides around a window 21 to form the rear hollow column or door pillar 22 and the inclined rear extension 23 of top rail 17. The aforesaid plate 19 thus forms the inner channeled member of column 22 and extension 23, terminating at 24 where another plate 25 has its upper edge 26 overlapped with edge 24 and welded thereto. The plate 25 thus provides a downward extension of plate 19 and, as shown in Figs. 1 and 4, has a lower inturned flange 27 welded to the arched rear wheel house structure 28. The wheel house 28 extends outwardly from plate 25 to provide the lower part of the hollow column 22, the latter structure terminating in a forward foot 29 welded at 30 to a hollow body bottom rail 31 so that the latter and column 22 are structurally continuous.

It will be understood that the outer shell 18$^b$ of column 22 is a downward extension of the outer shell 18 of top rail 17. The rear wheel fender 32 is removably secured by fasteners 33 to the wheel house 28. The outer skin at 18 extends rearwardly and around the curved rear portion of side section B to the weld line 34 for welding to the rear panel C.

Above the window 21, the inner plate 19 extends inwardly at 35 spaced from the outer shell 18 to provide a rigid transverse hollow beam, the outer shell having a shouldered flange 36 welded to plate 35 to form therewith a window frame for the window opening 37.

For rigidly connecting the side sections B across the rear of the body, we have provided the transverse shelf brace 38 having side flanges 39 welded along the lower edge 24 of the plate 19 rearwardly below window 21, the shelf 38 curving at 39' to continue upwardly and forwardly around rear window 37 to provide the aforesaid inner panel 35. The forward edge of shelf 38 has a downwardly inclined stiffener flange 40 to the rear faces of which are welded the side inclined stiffener plates 41, each of these having a portion extending above the adjacent wheel house for attachment with the flange 40. Each of these side plates has a side flange 42 (see Figs. 3 and 4) welded to the inner column plate 25 and wheel house 28, the lower end of each plate 41 being welded to the rear face of a transverse channeled cross brace 43.

The central part of brace 43 is arched at 44 to accommodate the propeller shaft (not shown), it being understood that a tunnel-like housing for the propeller shaft extends longitudinally of the body. The tunnel structure is not illustrated as it is well known in the art and in order to best illustrate the body structure the sections for the view in Fig. 1 is taken just to one side of the longitudinal central plane of the vehicle so that the tunnel is not disclosed.

The channel brace 43 has its ends flared at 45 for welding to a wheel house 28, the front and rear flanges 46 and 47 thereof being welded to a rear floor 48 for the rear compartment or storage space 49. The lower edge of the wheel house 28 is indicated at 50 in Fig. 1 and for additionally supporting floor 48 each wheel house has welded thereto an angle bracket 51 arched at 52 in the path of swing of the rear axle central driving structure 53 to provide clearance therefor.

Bolts 54 removably secure the brace 43, and therefore the body parts connected thereto, with the chassis rails 10 and 11. The floor 48 lies flush at its forward edge with the rear edge of the forwardly extending floor portion 55, the floor 48 having the offset forward edge 56 for this purpose.

The inner plates 19 and shelf 38 are braced between the wheel house structure 28 and cross brace 43 by a pair of crossed diagonal brace members 57 and 58 each having stiffener ribs 59 depressed therefrom. Each of the diagonal braces has an upper end welded to flange 40 and a side brace 41 while the lower ends of the diagonal braces are each welded to and between a side brace 41 and the cross brace 43. A central stiffener plate 60 is welded to the crossed portions of diagonal braces 57 and 58 whereby a very rigid cross bracing for the body sides is obtained. The inclined cross bracing provided by braces 57 and 58 further serves as the back rest for the rear seat (not shown).

The shelf 38 constitutes a structural connecting and bracing means for the body side forming structures or panels B, and the relatively rigid diagonally arranged arms or braces 57 and 58 constitutes an X-brace structurally and torsionally bracing the body side structures. The X-brace structure serves as a means for imparting strength and torsional rigidity to the body structure and particularly the side structures, and torsional strains and stresses which may be induced in the body due to a weaving action thereof, for instance, are successfully resisted.

The back panel C has an opening bounded by a flange 61 to provide access to the baggage compartment 49 rearward of braces 57 and 58, the flanged opening being adapted to receive a suitable hinged door closure (not shown).

The rear portion of the body structure is braced by a transverse hollow brace member 62 having its ends welded to the chassis rails 10 and 11. Fixed to floor 48 and depending from each side thereof is a bracket 63 adapted to removably attach the body structure to the chassis rails by bolts 64.

Various modifications and changes will readily be apparent from the teachings of our invention and many changes may be made within the scope and spirit of our invention as defined in the appended claims, our invention in its broader aspects not being limited to the foregoing described illustrative embodiment.

We claim:

1. In a motor vehicle body structure, a pair of sheet metal body forming side structures each having a wheel house, means for structurally uniting and bracing said structures comprising transverse bracing, said bracing including a shelf brace having its opposite end portions structurally connected with a respective body forming side structure, and bracing means extending between said shelf brace and said wheel houses, said bracing means comprising obliquely extending members having their upper end portions fixed to said shelf brace and their lower end portions structurally secured to said wheel houses respectively.

2. In a motor vehicle body structure, a pair of sheet metal body forming side structures each having a wheel house, each of said side structures including inner and outer panel portions, and means for structurally connecting said side structures comprising transverse bracing, said bracing including a horizontal shelf brace having its opposite end portions structurally connected with a respective inner panel portion, and an X-brace structure structurally connecting said horizontal shelf brace and said wheel houses.

3. In a motor vehicle body structure, a pair of sheet metal body forming side structures each having a wheel house, each of said side structures including companion upper and lower sections, means for structurally connecting the companion sections of said side structures, means for structurally connecting said side structures including a transversely extending shelf member having its opposite end portions connected with a respective body forming side structure adjacent the connection of the companion sections thereof, and bracing means extending between said shelf member and said wheel houses, said bracing means comprising oblique members having end portions structurally connected with said shelf member and said wheel houses respectively.

4. In a motor vehicle body structure, a plurality of fabricated sheet metal body forming side structures each including inner and outer panel portions having a window forming opening therein, each of said structures further including a wheel house, and means for structurally connecting said side structures including transverse bracing, said bracing including a horizontal plate member having end portions secured to a respective inner panel portion adjacent said window opening and in vertically spaced relation to said wheel house, said structural bracing means further including relatively rigid oblique members extending between and structurally connecting said horizontal plate member and said wheel houses.

5. In a motor vehicle body structure, a pair of sheet metal body forming side structures each having inner and outer panel portions, and means for structurally connecting said side structures comprising transverse bracing, said bracing including a horizontal shelf brace having its opposite end portions structurally connected with a respective inner panel portion, and a rigid X-brace structure structurally connecting said horizontal shelf brace and said outer panel portion.

6. In a motor vehicle body structure, a pair of sheet metal body side forming structures, a wheel house for each of said structures, an angular plate member secured to each of said wheel houses, means for structurally connecting said side structures comprising transverse bracing, said bracing including a horizontal member having end portions structurally connected with a respective side structure, and a relatively rigid X-brace structure extending between said horizontal member and said side structures, said X-brace structure including oblique arms having end portions structurally connected with said horizontal member and said angular plate members respectively.

7. In a motor vehicle body structure, a pair of sheet metal body side forming structures each including a wheel house, means for structurally connecting said side structures comprising transverse bracing, said bracing including a horizontal plate-like member having end portions structually connected with a respective side structure, said member having a flanged edge portion, and a relatively rigid X-brace structure extending between said horizontal member and said side structures, said X-brace structure including oblique arms having their upper end portions fixed to the flanged edge portion of said horizontal member and their lower end portions structurally connected with said wheel houses respectively, said arms and said flanged edge portion cooperating to form a rest for a seat back.

8. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, and a transverse substantially horizontal shelf brace having its outer edge secured to said inner panel extension.

9. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, a transverse horizontal shelf brace having its outer edge secured to said inner panel extension, said outer panel extension being formed with a wheelhouse structure below said shelf brace.

10. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, a transverse horizontal shelf brace having its outer edge secured to said inner panel extension, said outer panel extension being formed with a wheelhouse structure below said shelf brace, and a transversely extending inclined brace structure secured to said wheelhouse and the forward portion of said shelf brace.

11. In a motor vehicle body structure, a hollow compression roof rail extending longitudinally of the body structure, said roof rail including spaced inner and outer connected panels, said panels extending downwardly at the rear of said body structure to provide a hollow door column, a rear transverse panel extended from said outer roof rail panel to form the outer skin of the body structure, said inner panel extending between said column and said rear panel, a transverse horizontal shelf brace having its outer edge secured to said inner panel extension, said outer panel extension being formed with a wheelhouse structure below said shelf brace, and a transversely extending inclined brace structure secured to said wheelhouse and the forward portion of said shelf brace, said brace structure including a pair of diagonally arranged members.

12. In a motor vehicle body, a pair of sheet metal body forming side structures, a wheel house associated with each of said structures, a stiffener member secured to each of said side structures and the associated wheel house and having a portion thereof extending substantially vertically therefrom, said body having a rear window opening therein, a frame work for said opening, means structurally connecting said side structures including a transversely extending shelf structure having end portions secured to said stiffener members respectively, a floor structure, and brace means extending between said shelf structure and said floor structure, said brace means including obliquely extending arms having end portions fastened to said shelf structure.

13. In a motor vehicle body, a plurality of sheet metal body forming panel structures providing a rear window opening and oppositely disposed side window openings adjacent the latter, a floor structure and brace means extending transversely of said body and structurally connecting at least two of said panel structures, said brace means including a horizontally positioned sheet metal shelf forming structure disposed below said window openings and extending rearwardly from a point adjacent said side window openings to a point adjacent said rear window opening, and brace means extending between said floor structure and said shelf structure.

CARL BREER.
ALEXANDER G. HERRESHOFF.
OLIVER H. CLARK.
ROBERT CADWALLADER.